(No Model.)

N. L. BARRON.
CAKE MIXER.

No. 415,893. Patented Nov. 26, 1889.

WITNESSES.
John H. Taylor.
Ellen B. Tomlinson.

INVENTOR
Nell Louise Barron
by Alex. P. Browne, atty.

UNITED STATES PATENT OFFICE.

NELL LOUISE BARRON, OF BARTON, VERMONT.

CAKE-MIXER.

SPECIFICATION forming part of Letters Patent No. 415,893, dated November 26, 1889.

Application filed December 1, 1888. Serial No. 292,384. (No model.)

*To all whom it may concern:*

Be it known that I, NELL LOUISE BARRON, of Barton, in the county of Orleans and State of Vermont, a citizen of the United States, have invented certain new and useful Imments in Cake-Mixers, of which the following is a specification.

My invention relates to that class of utensils ordinarily known as "cake-mixers," containing a receptacle for the dough or other substance to be mixed and a series of blades or beaters adapted to be revolved in the receptacle to beat or mix up its contents. My present invention relates particularly to improvements in the construction of apparatus of this class.

Figure 1:
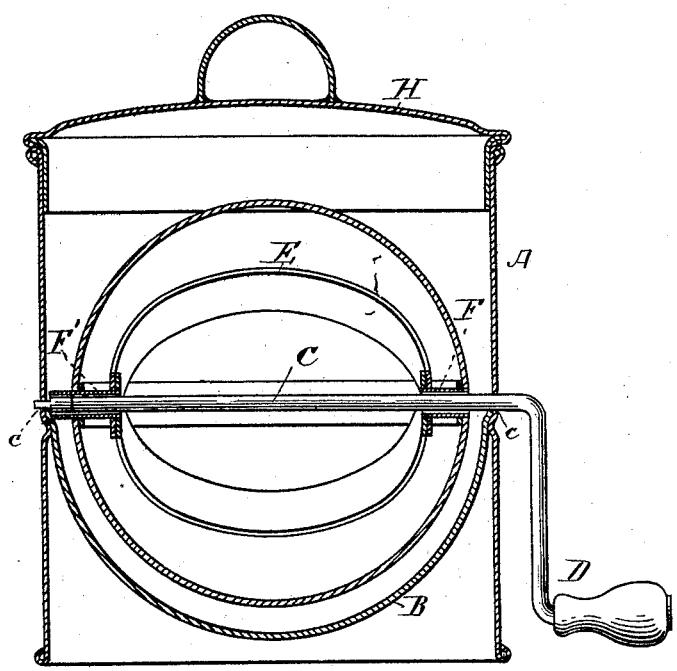
Figure 3:
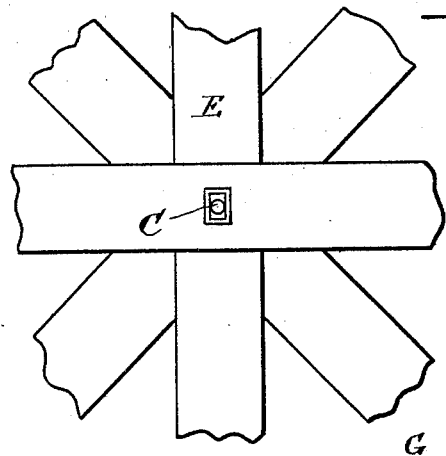
Figure 2:
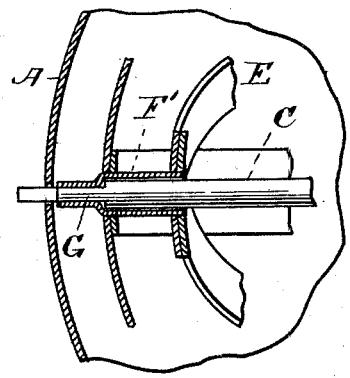
Figure 4:

In the accompanying drawings I have represented at Figure 1 in vertical section a device embodying my present invention in the form now best known to me; at Fig. 2, a portion of the same device in horizontal section on an enlarged scale; and at Figs. 3 and 4, detail views of portions of the apparatus, as will be hereinafter more fully described.

In the drawings, A represents a cylindrical outer case, within which is placed a hemispherical interior cup B, the rim of the latter being united to the former at a point sufficiently high to carry the hemispherical cup B clear of the table upon which the device will ordinarily be rested when in use. In this way the lower rim of the cylindrical case A furnishes a good support for the device when in operation.

A transverse shaft C extends across the case A, and is provided with bearings in its walls at *c c*, as shown, these bearings being preferably located just above the rim of the hemispherical cup B. This shaft C is provided with a crank and handle D for revolving it. Mounted upon this shaft is a beater E, provided with blades in the ordinary manner to cut or beat the dough or other substance to be operated on. The blades of the beater are attached to sleeves F F', which encircle the shaft C. At the end of this shaft farthest from the handle there is formed a square shoulder G, (see Fig. 4,) and a portion of the surrounding sleeve F' is also squared. This construction is illustrated at Fig. 3, and its object is to unite the blades and the shaft, so that they will turn together. At the same time when it is desired to remove the shaft and beater from the device to clean them this can readily be done by withdrawing the shaft C, which will slip out of the sleeves F F', and which when so withdrawn will leave the beater loose in the vessel, from whence it can be then readily lifted out.

I find in practice that when the vessel A is made, as I prefer, of stout metal, the bearings *c c* may be conveniently formed by simple perforations of suitable size in the walls of the vessel, and I have accordingly so represented them. A removable cover H should also be provided for the case A, as shown.

I claim—

1. The combination, with the outer case and the inner cup, of the shaft C, having bearings in the walls of the outer case, the beater carried by the said shaft, and the sleeves F and F', surrounding the shaft and having the blades of the beater attached thereto, the sleeve F' extending through the beater-blades and having squared portion, as shown, the shaft C having squared portion G, fitting the squared portion of said sleeve, substantially as shown, and for the purpose specified.

2. The combination, with the outer case and the inner cup, of the shaft C, having bearings in the walls of the outer case and formed with squared portion G near one end and reduced round portion beyond said squared portion, the beater on the said shaft, and the sleeves F and F' on the shaft and having the beater-blades attached thereto, the sleeve F extending from the inner to the outer blade at its end of the shaft, and the sleeve F' extending through the blades and formed with squared portion extending nearly to the outer case and fitting the squared portion of the shaft, substantially as herein shown and described.

In testimony whereof I have hereunto subscribed my name this 28th day of November, A. D. 1888.

NELL LOUISE BARRON.

Witnesses:
JAMES BUSWELL,
ROSE A. RANN.